United States Patent
Toyama et al.

(10) Patent No.: US 12,339,398 B2
(45) Date of Patent: Jun. 24, 2025

(54) LIDAR APPARATUS

(71) Applicant: DENSO CORPORATION, Kariya (JP)

(72) Inventors: Kohei Toyama, Kariya (JP); Shunpei Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 939 days.

(21) Appl. No.: 16/942,393

(22) Filed: Jul. 29, 2020

(65) Prior Publication Data

US 2020/0355800 A1   Nov. 12, 2020

Related U.S. Application Data

(63) Continuation of application No. PCT/JP2019/003009, filed on Jan. 29, 2019.

(30) Foreign Application Priority Data

Jan. 31, 2018   (JP) ................................ 2018-015602

(51) Int. Cl.
*G01S 7/481*     (2006.01)
*G01S 17/931*    (2020.01)
*G02B 26/10*     (2006.01)

(52) U.S. Cl.
CPC .......... *G01S 7/4816* (2013.01); *G01S 7/4813* (2013.01); *G01S 7/4817* (2013.01); *G01S 17/931* (2020.01); *G02B 26/105* (2013.01)

(58) Field of Classification Search
CPC .... G01S 7/4816; G01S 17/931; G02B 26/105
See application file for complete search history.

(56) References Cited

U.S. PATENT DOCUMENTS

| | | | |
|---|---|---|---|
| 5,808,727 A | 9/1998 | Katayama | |
| 8,629,977 B2* | 1/2014 | Phillips | G01S 7/4817 356/3.01 |
| 2014/0009747 A1* | 1/2014 | Suzuki | G01S 7/4817 356/4.01 |
| 2014/0029075 A1* | 1/2014 | Bayha | G02B 26/105 359/200.7 |
| 2017/0167868 A1* | 6/2017 | Hirai | G01S 7/4817 |
| 2018/0231644 A1* | 8/2018 | Gassend | G01S 7/4817 |
| 2019/0212446 A1* | 7/2019 | Jeong | G01S 17/08 |

FOREIGN PATENT DOCUMENTS

| | | | | |
|---|---|---|---|---|
| JP | H03-73931 U | 7/1991 | | |
| JP | 10-082851 A | 3/1998 | | |
| WO | WO-2017082540 A1 * | 5/2017 | ........... | G02B 26/124 |

* cited by examiner

*Primary Examiner* — Isam A Alsomiri
*Assistant Examiner* — Joseph C Fritchman
(74) *Attorney, Agent, or Firm* — Maschoff Brennan

(57) ABSTRACT

A partition plate includes a material that blocks transmission of light and partitions an internal space of an enclosure into a light-projecting space where a light projector is disposed and a light-receiving space where a light receiver is disposed. A light shielding plate is configured by a material that blocks transmission of light, is provided between a light-projecting deflector, which is a portion of a deflecting mirror used for light projection, and a light-receiving deflector, which is a portion of the deflecting mirror used for light reception, and integrally rotates with the deflecting mirror. Further, the partition plate has, with respect to at least a part of a peripheral portion of the light shielding plate, an overlap portion where a plate surface of the partition plate and a plate surface of the light shielding plate overlap without being in contact with each other.

7 Claims, 10 Drawing Sheets

LIDAR APPARATUS

CROSS-REFERENCE TO RELATED APPLICATION

The present application is based on and claims the benefit of priority from Japanese Patent Application No. 2018-015602 filed Jan. 31, 2018, and the description of which is incorporated herein by reference.

BACKGROUND

Technical Field

The present disclosure relates to a lidar apparatus including a deflecting mirror that is to be rotated.

Related Art

A lidar apparatus includes, as a light deflecting device that deflects light to perform scanning, a deflecting mirror that is to be rotated. The lidar is also written as LIDAR, which is an abbreviation for Light Detection and Ranging.

SUMMARY

As an aspect of the present disclosure, a lidar apparatus is provided which includes: a light projector configured to emit light in a predetermined direction; a light receiver configured to receive light arriving from a predetermined direction; a scanner including a deflecting mirror configured to reflect light entering from the light projector, the scanner configured to rotate the deflecting mirror with respect to a predetermined rotation axis, thereby changing an output direction, which is a direction for the light entering from the light projector to be reflected by the deflecting mirror and outputted, along a main scanning direction orthogonal to an axial direction of the rotation axis, the scanner configured to cause reflected light from a target present within a scanning range to be reflected by the deflecting mirror and led to the light receiver; an enclosure that houses all of the light projector, the light receiver, and the scanner; a partition plate configured by a material that blocks transmission of light, the partition plate configured to partition an internal space of the enclosure into a light-projecting space where the light projector is disposed and a light-receiving space where the light receiver is disposed; and a light shielding plate configured by a material that blocks transmission of light, the light shielding plate provided between a light-projecting deflector, which is a portion of the deflecting mirror used for light projection, and a light-receiving deflector, which is a portion of the deflecting mirror used for light reception, the light shielding plate configured to integrally rotate with the deflecting mirror. The partition plate has, with respect to at least a part of a peripheral portion of the light shielding plate, an overlap portion where a plate surface of the partition plate and a plate surface of the light shielding plate overlap portion without being in contact with each other.

DETAILED DESCRIPTION OF THE PREFERRED EMBODIMENTS

A lidar apparatus includes, as a light deflecting device that deflects light to perform scanning, a deflecting mirror that is to be rotated. The lidar is also written as LIDAR, which is an abbreviation for Light Detection and Ranging.

JP-T-2013-546009 listed below describes a technology where in a case of using the same deflecting mirror for light projection and light reception, a light shielding plate is attached to the deflecting mirror to separate a light-projecting space where a light projector used for light projection is disposed and a light-receiving space where a light receiver for light reception is disposed.

However, since the light shielding plate rotates with the deflecting mirror, it is necessary to provide a space between the light shielding plate and a member therearound. Leakage of light through this space from the light projector into the light receiver causes a problem such as detecting a non-existent obstacle at very close range or detecting an obstacle in a direction where it does not actually exist.

An object of the present disclosure is to provide a technology that reduces a decrease in detection performance due to leakage of light between a light projector and a light receiver in a lidar apparatus.

Embodiments of the present disclosure will be described below with reference to the drawings.

First Embodiment

[1-1. Configuration]

Figure 1:
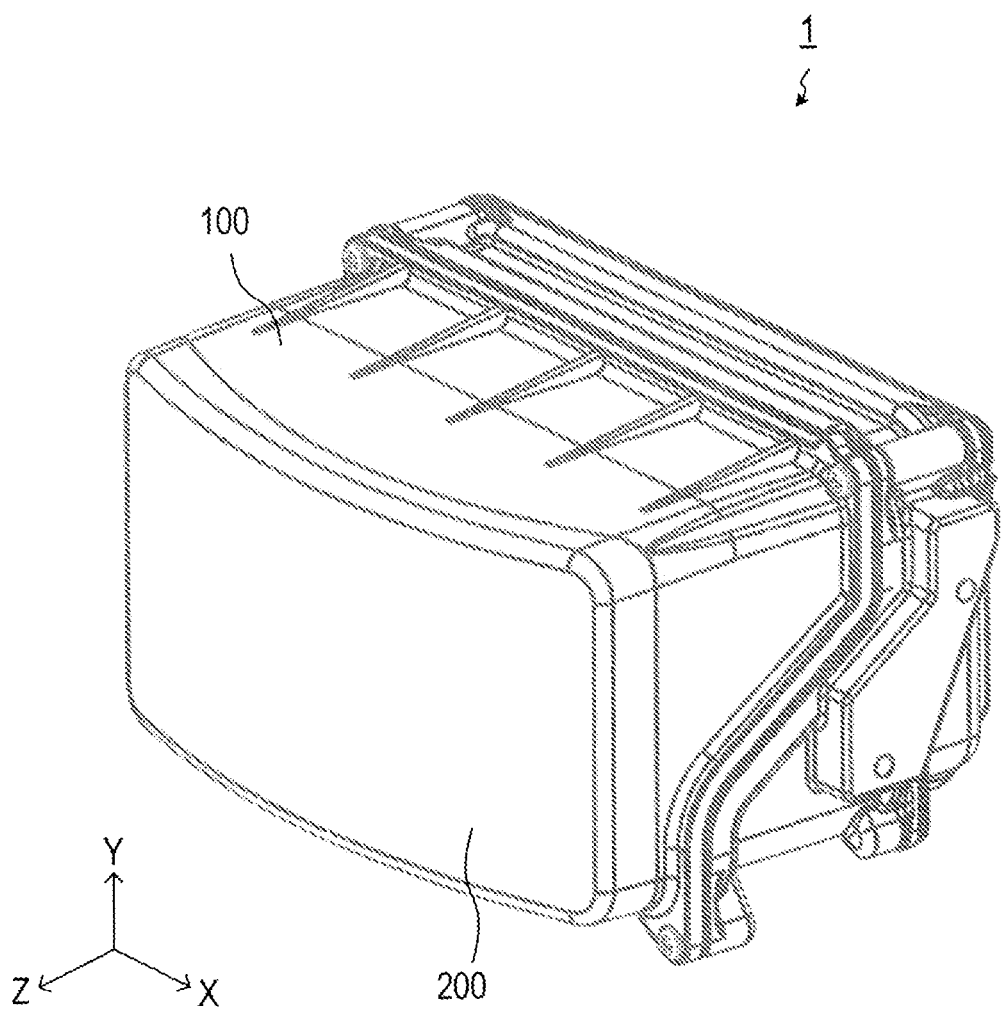
FIG. 1 is a perspective view illustrating an appearance of a lidar apparatus.

A lidar apparatus 1 according to the present embodiment illustrated in FIG. 1 is installed in a vehicle in use to detect a variety of objects that exist around the vehicle, for example. A lidar is also written as LIDAR. LIDAR is an abbreviation for Light Detection and Ranging.

The lidar apparatus 1 includes an enclosure 100 and an optical window 200 as illustrated in FIG. 1.

The enclosure 100 is a resin box body of a rectangular parallelepiped that is open at one side and a later-described light detection module 2 is housed therein.

The optical window 200, which is a resin lid body fixed to the enclosure 100 so as to cover an opening of the enclosure 100, lets a laser beam supplied from the light detection module 2 disposed inside the enclosure 100 through.

A direction along a longitudinal direction of the opening, which is substantially in a rectangular shape, of the enclosure 100 is defined hereinafter as an X-axis direction, a direction along a lateral direction of the opening is defined as a Y-axis direction, and a direction orthogonal to an X-Y plane is defined as a Z-axis direction. It should be noted that right and left along the X-axis direction and top and bottom along the Y-axis direction are defined as seen from an opening side of the enclosure 100. Further, regarding front and rear along the Z-axis direction, the opening side of the enclosure 100 is defined as front and a depth side thereof is defined as rear.

[1-2. Light Detection Module]

Figure 2:
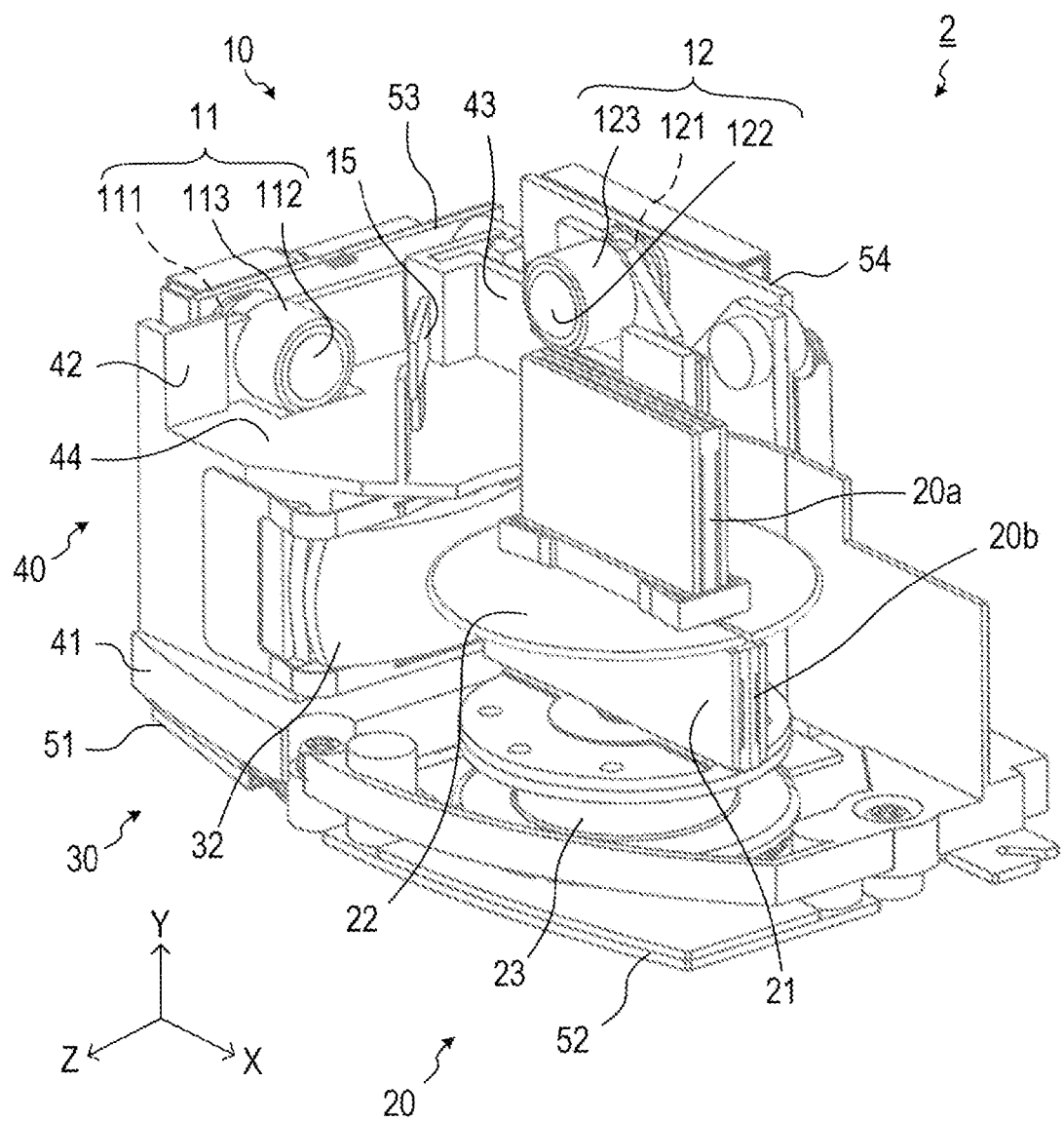
FIG. 2 is a perspective view illustrating a configuration of a light detection module housed in an enclosure of the lidar apparatus.
Figure 3:
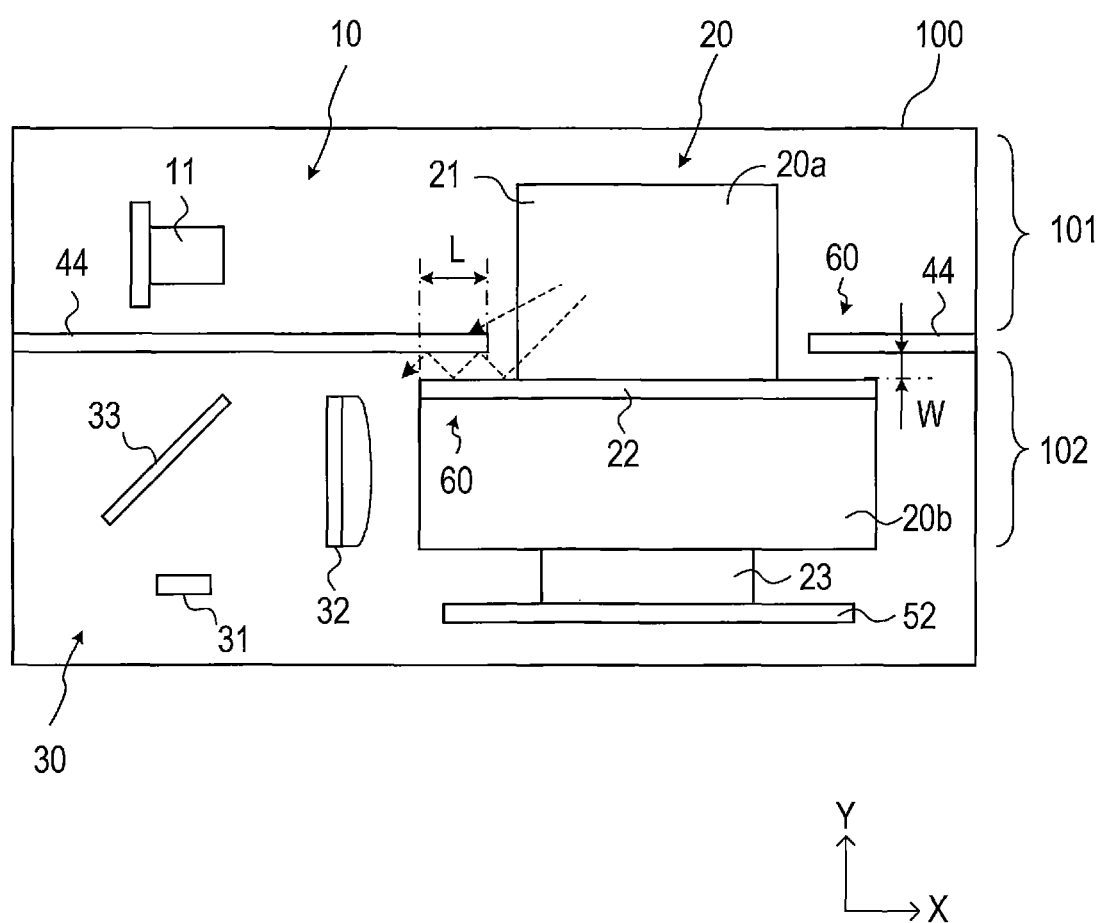
FIG. 3 is an explanatory diagram illustrating a position of a partition plate relative to a light shielding plate according to a first embodiment.

The light detection module 2 includes a light projector 10, a scanner 20, and a light receiver 30 as illustrated in FIG. 2 and FIG. 3. The light detection module 2 is assembled in the enclosure 100 via a frame 40. FIG. 3, which is a schematic diagram illustrating a schematic configuration of components of the light detection module 2, is not intended to especially accurately illustrate locations, etc. of components that constitute the light projector 10 and the light receiver 30.

[1-2-1. Scanner]

The scanner 20 includes a mirror module 21, a light shielding plate 22, and a motor 23.

The mirror module 21 is a flat plate-shaped member with two respective deflecting mirrors, which reflect light, attached at both sides thereof. The mirror module 21, which is vertically disposed on the motor 23, rotates in accordance with driving of the motor 23.

The light shielding plate 22, which is a circular and plate-shaped member, is provided near a center of the mirror module 21 in a vertical direction and integrated with the mirror module 21 with a plate surface thereof being orthogonal to a rotation axis of the rotation. The light shielding plate 22 is made of a material that blocks transmission of light.

Hereinafter, an upper portion of the mirror module 21 relative to the light shielding plate 22 is referred to as a light-projecting deflector 20a and a lower portion of the mirror module 21 relative to the light shielding plate 22 is referred to as a light-receiving deflector 20b. Further, the mirror module 21 has a wider reflecting surface at the light-receiving deflector 20b than at the light-projecting deflector 20a. Specifically, a width of the light-receiving deflector 20b is equal to a diameter of the light shielding plate 22 while a width of the light-projecting deflector 20a is approximately a half thereof. It should be noted that the width of the light-receiving deflector 20b may be equal to or less than the diameter of the light shielding plate 22 while the width of the light-projecting deflector 20a may be less than the width of the light-receiving deflector 20b.

[1-2-2. Light Projector]

The light projector 10 includes two light-emitting modules 11 and 12. The light projector 10 may include a light-projecting turning mirror 15.

The light-emitting module 11 is a composite component including a light source 111 and a light-emitting lens 112, which are integrated with each other with a cylindrical holder 113 in between while being opposed to each other. A semiconductor laser is used as the light source 111. The light-emitting lens 112 is a lens that reduces a beam width of light supplied from the light source 111. Likewise, the light-emitting module 12 includes a light source 121, a light-emitting lens 122, and a holder 123. Description of the light-emitting module 12, which is similar to the light-emitting module 11, is omitted.

The light-projecting turning mirror 15 is a mirror that changes a travel direction of light.

The light-emitting module 11 is disposed such that light outputted from the light-emitting module 11 directly enters the light-projecting deflector 20a.

The light-emitting module 12 is disposed such that light outputted from the light-emitting module 12 enters the light-projecting deflector 20a as a result of a travel direction thereof being deflected at approximately 90° by the light-projecting turning mirror 15.

Herein, the light-emitting module 11 is disposed such that it outputs light from left to right along the X-axis direction. The light-emitting module 12 is disposed such that it outputs light from rear to front along the Z-axis direction. Further, the light-projecting turning mirror 15 is disposed such that it does not block a path of light directed from the light-emitting module 11 to the light-projecting deflector 20a. FIG. 3 illustrates only the light-emitting module 11 without illustrating the light-emitting module 12 and the light-projecting turning mirror 15 to symbolize a space where the light projector 10 is disposed.

[1-2-3. Light Receiver]

The light receiver 30 includes a light-receiving device 31. The light receiver 30 may include a light-receiving lens 32 and a light-receiving turning mirror 33.

The light-receiving device 31 includes a plurality of APDs aligned in a line, namely, an APD array. APD refers to an avalanche photodiode. The light-receiving lens 32 is a lens that focuses light arriving from the light-receiving deflector 20b. The light-receiving turning mirror 33, which is not illustrated as hidden behind the light-receiving lens 32 in FIG. 2, is a mirror disposed at a left side of the light-receiving lens 32 along the X-axis direction to change the travel direction of light. The light-receiving device 31 is disposed below the light-receiving turning mirror 33.

The light-receiving turning mirror 33 is disposed to deflect the path of light downward at approximately 90°, causing light entering from the light-receiving deflector 20b through the light-receiving lens 32 to reach the light-receiving device 31.

The light-receiving lens 32 is disposed between the light-receiving deflector 20b and the light-receiving turning mirror 33. The light-receiving lens 32 reduces a beam diameter of an optical beam that is to enter the light-receiving device 31 to approximately a device width of the APDs.

[1-2-4. Frame]

The frame 40 is a member for assembling respective components of the light projector 10, the scanner 20, and the light receiver 30 into one piece, thereby assembling these components in the enclosure 100 in a positionally fixed state.

The frame 40 includes a frame lower portion 41, a frame side portion 42, a frame back portion 43, and a partitioning portion 44. The partitioning portion 44 corresponds to a partition plate. The frame 40 is made of a material that blocks the transmission of light.

A light-receiving substrate 51 assembled with the light-receiving device 31 and a motor substrate 52 assembled with the scanner 20 are attached to the frame lower portion 41 from a lower side thereof. Accordingly, the frame lower portion 41 has a hole at each of a portion corresponding to the path of light leading from the light-receiving turning mirror 33 to the light-receiving device 31 and a portion where the motor 23 of the scanner 20 is to be disposed.

A light-emitting substrate 53 assembled with the light-emitting module 11 is attached to the frame side portion 42.

A light-emitting substrate 54 assembled with the light-emitting module 12 is attached to the frame rear portion 43.

The partitioning portion 44 is provided at a position to separate a space where the components belonging to the light projector 10 are disposed from a space where the components belonging to the light receiver 30 are disposed. The partitioning portion 44 is assembled with the light-projecting turning mirror 15, the light-receiving turning mirror 33, and the light-receiving lens 32. FIG. 3 illustrates, among the frame 40, only the partitioning portion 44 for the purpose of more clearly describing features of the present disclosure.

An internal space of the enclosure 100 is divided into two spaces disposed in the vertical direction by the partitioning portion 44 of the frame 40 and the light shielding plate 22 of the scanner 20. Of these two spaces, an upper space where the light projector 10 is disposed is referred to as a light-projecting space 101 and a lower space where the light receiver 30 is disposed is referred to as a light-receiving space 102.

The partitioning portion 44 is in a shape having, with respect to at least a part of a peripheral portion of the light shielding plate 22, an overlap portion 60 where a plate surface of the partitioning portion 44 faces the plate surface of the light shielding plate 22 with a space in between as illustrated in FIG. 3. The overlap portion 60 is provided at least between the light-receiving lens 32 and the rotation axis of the scanner 20. It should be noted that partitioning portion 44 is disposed closer to the light-projecting space 101 than the light shielding plate 22 is.

A distance W between the plate surfaces in the overlap portion 60 is set at least at a minimum width that needs to be ensured to prevent the partitioning portion 44 from interfering with the rotation of the scanner 20. A width L of the overlap portion 60 is set at a length sufficient for light entering the overlap portion 60 at a previously assumed incidence angle to be reflected at least once in the overlap portion 60. The previously assumed incidence angle is determined from, for example, at least one of a size and a shape of the enclosure 100, at least one of a size, a shape, and a location of a component housed in the enclosure 100, and characteristics, etc. of the light outputted from the light-emitting module 11.

[1-3. Motion of Light Detection Module]

The light outputted from the light-emitting module 11 enters the light-projecting deflector 20a. Further, the light outputted from the light-emitting module 12 enters the light-projecting deflector 20a as a result of the travel direction thereof being deflected at approximately 90° by the light-projecting turning mirror 15. The light having entered the light-projecting deflector 20a is outputted through the optical window 200 in a direction corresponding to a rotation angle of the mirror module 21. A range to be irradiated with the light through the mirror module 21 is a scanning range. For example, assuming that a front direction along a Z-axis is 0 degrees, a ±60° range extending toward the X-axis direction is defined as the scanning range.

Reflected light (hereinafter referred to as arriving light) from a target, which is located in a predetermined direction corresponding to a rotational position of the mirror module 21, passes through the optical window 200, being reflected on the light-receiving deflector 20b and received by the light-receiving device 31 through the light-receiving lens 32 and the light-receiving turning mirror 33. The predetermined direction corresponding to the rotational position of the mirror module 21 refers to an output direction of the light from the light-projecting deflector 20a.

As expressed by a dotted line in FIG. 3, the light outputted from the light-emitting module 11 and reflected on the light-projecting deflector 20a, etc. to the overlap portion 60 is sufficiently attenuated by being reflected at least once in the overlap portion 60, reaching the light-receiving space 102. The light from the light-receiving space 102 toward the light-projecting space 101 is likewise attenuated in the overlap portion 60.

[1-4. Effects]

The present embodiment described above in detail achieves the following effects.

(1a) In the present embodiment, a boundary portion between the light shielding plate 22 and the partitioning portion 44 has the overlap portion 60 and light passing through the overlap portion 60 is repeatedly reflected to be attenuated during passage thereof. This makes it possible to reduce intensity of each of light that leaks from the light-projecting space 101 into the light-receiving space 102 through the overlap portion 60 and light that leaks from the light-receiving space 102 to the light-projecting space 101. As a result, it is possible to reduce a decrease in detection performance resulting from detecting a non-existent obstacle at very close range or detecting an obstacle in a direction where it does not actually exist, especially due to an influence of the light leaking from the light-projecting space 101 into the light-receiving space 102.

Figure 4:
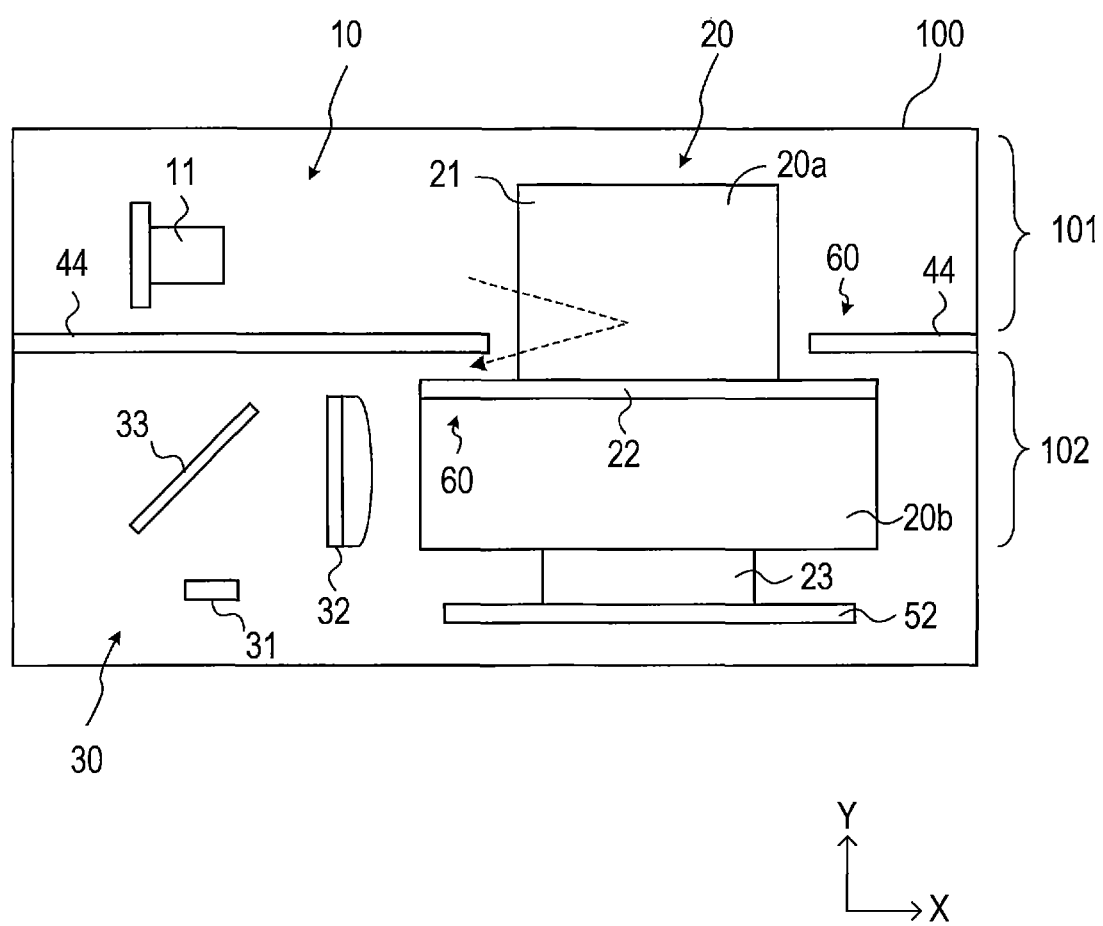
FIG. 4 is an explanatory diagram illustrating a schematic configuration of a lidar apparatus according to the first embodiment seen from the front and a function at an overlap portion.
Figure 5:
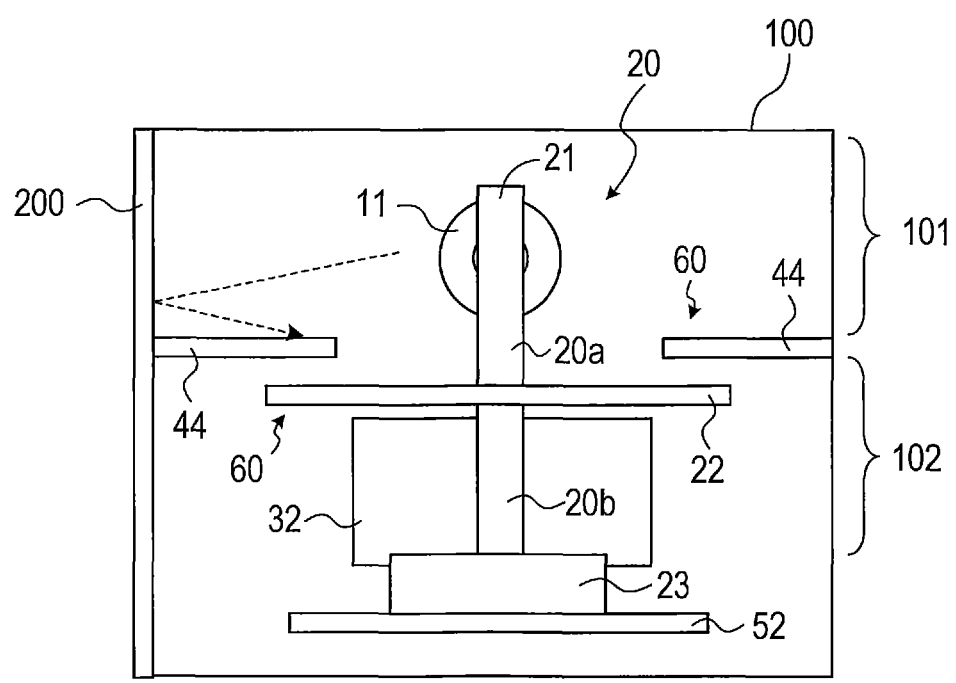
FIG. 5 is an explanatory diagram illustrating a schematic configuration of the lidar apparatus according to the first embodiment seen from the side and the function at the overlap portion.

(1b) In the present embodiment, the partitioning portion 44 is provided closer to the light-projecting space 101 than the light shielding plate 22 is, allowing for effectively reducing leakage of the light directed from the light-emitting modules 11 and 12 to the optical window 200 and reflected from the optical window 200 into a side of the light-receiving space 102. That is, as illustrated in FIG. 4, the light directed from the light-emitting module 11 to the scanner 20 and reflected on the scanner 20 may directly enter the overlap portion 60 as it is. In contrast, as illustrated in FIG. 5, the light directed from the light-emitting module 11 to the optical window 200 and reflected on the optical window 200 is unlikely to directly enter the overlap portion 60. That is, the configuration according to the present embodiment is beneficial to a case where the reflected light from the optical window 200 has a larger influence on the leakage of light from the light-projecting space 101 into the light-receiving space 102 than the reflected light from the scanner 20.

(1c) In the present embodiment, the light-projecting deflector 20a is less in width than the light-receiving deflector 20b and the partitioning portion 44 has the overlap at a recessed portion of the light-projecting deflector 20a relative to the light-receiving deflector 20b. The wider light-receiving deflector 20b thus increases an amount of the received light to improve the detection performance and, further, a space inside the enclosure 100 can be efficiently used by using a stepped shape of the scanner 20.

Second Embodiment

[2-1. Difference from First Embodiment]

Since the second embodiment is similar in basic configuration to the first embodiment, differences therebetween will be described below. It should be noted that the same reference signs as in the first embodiment denote identical configurations and the foregoing descriptions are to be referred to.

The present embodiment is different from the first embodiment in the shape of a light shielding plate 22a.

Figure 6:
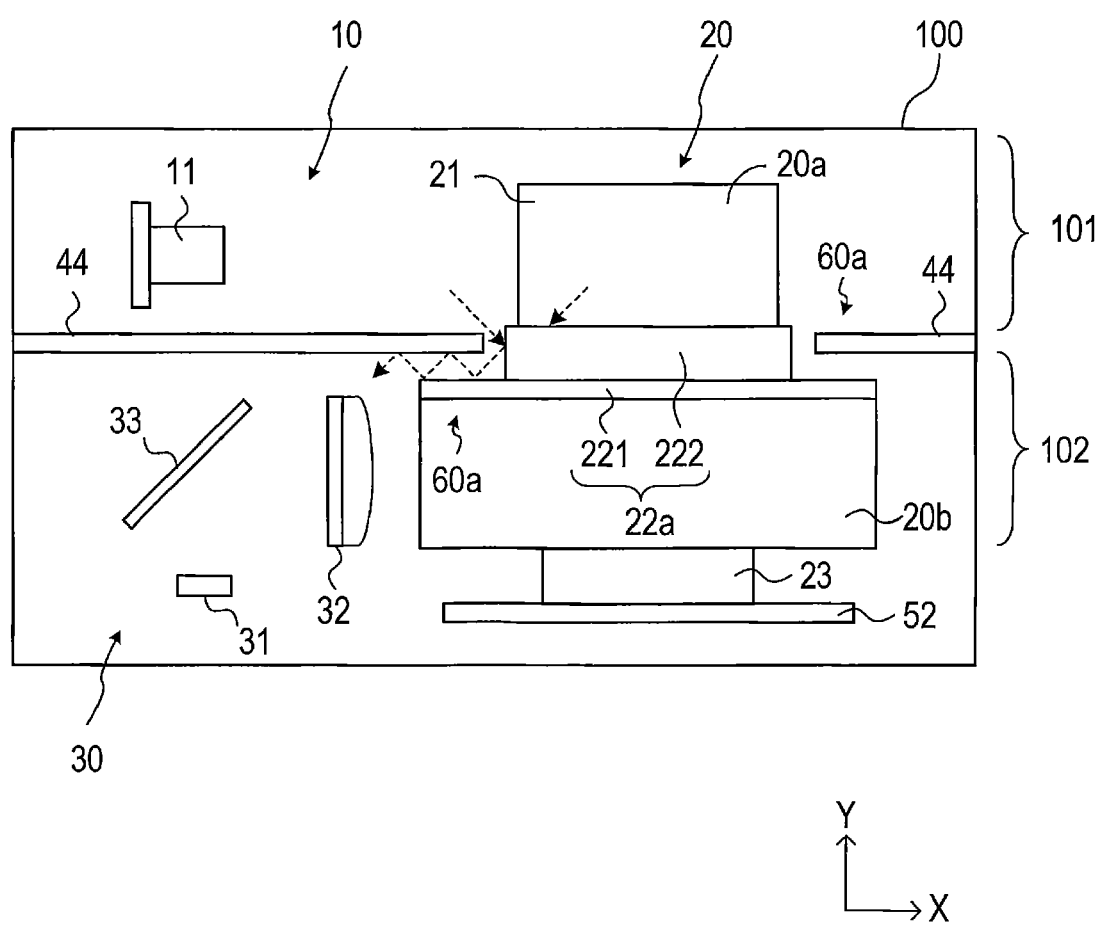
FIG. 6 is an explanatory diagram illustrating a schematic configuration of a lidar apparatus according to a second embodiment seen from the front and a function at an overlap portion.
Figure 7:
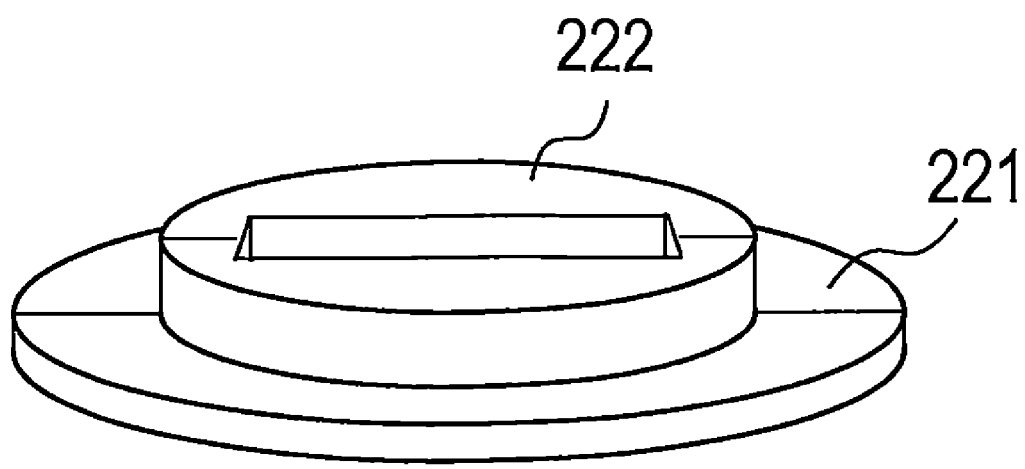
FIG. 7 is a perspective view illustrating a configuration of a light shielding plate according to the second embodiment.

As illustrated in FIG. 6 and FIG. 7, the light shielding plate 22a includes a plate-shaped portion 221 and a cylindrical portion 222.

The plate-shaped portion 221 is similar in shape to that of the light shielding plate 22 in the first embodiment. The cylindrical portion 222 is a portion in a cylindrical shape that is formed coaxially with the rotation axis of the scanner 20 while projecting upward from the plate-shaped portion 221, that is, toward the light-projecting space 101. The cylindrical portion 222 has a thickness sufficient to make an upper surface thereof coplanar with or higher than an upper plate surface of the partitioning portion 44. That is, the cylindrical portion 222 is formed so as to face a distal end portion of the partitioning portion 44.

In a case of using such a light shielding plate 22a, an overlap portion 60a with an L-shaped space is formed between the light shielding plate 22a and the partitioning portion 44 as illustrated in FIG. 6. Thus, light entering the overlap portion 60a is necessarily reflected in the overlap portion 60a irrespective of an angle of incidence. Further, due to the bend of the space, reflection in this space occurs repeatedly until the light passes therethrough.

[2-2. Effects]

The second embodiment described above in detail achieves the following effect in addition to the above effects (1a) to (1c) of the first embodiment.

(2a) The use of the light shielding plate 22a not only reduces the light entering the overlap portion 60a but also increases the frequency of the reflection of the light having entered the overlap portion 60a, thus allowing for effectively reducing leakage of the light through the overlap portion 60a.

Third Embodiment

[3-1. Difference from First Embodiment]

Since the third embodiment is similar in basic configuration to the first embodiment, differences therebetween will be described below. It should be noted that the same reference signs as in the first embodiment denote identical configurations and the foregoing descriptions are to be referred to.

Figure 8:
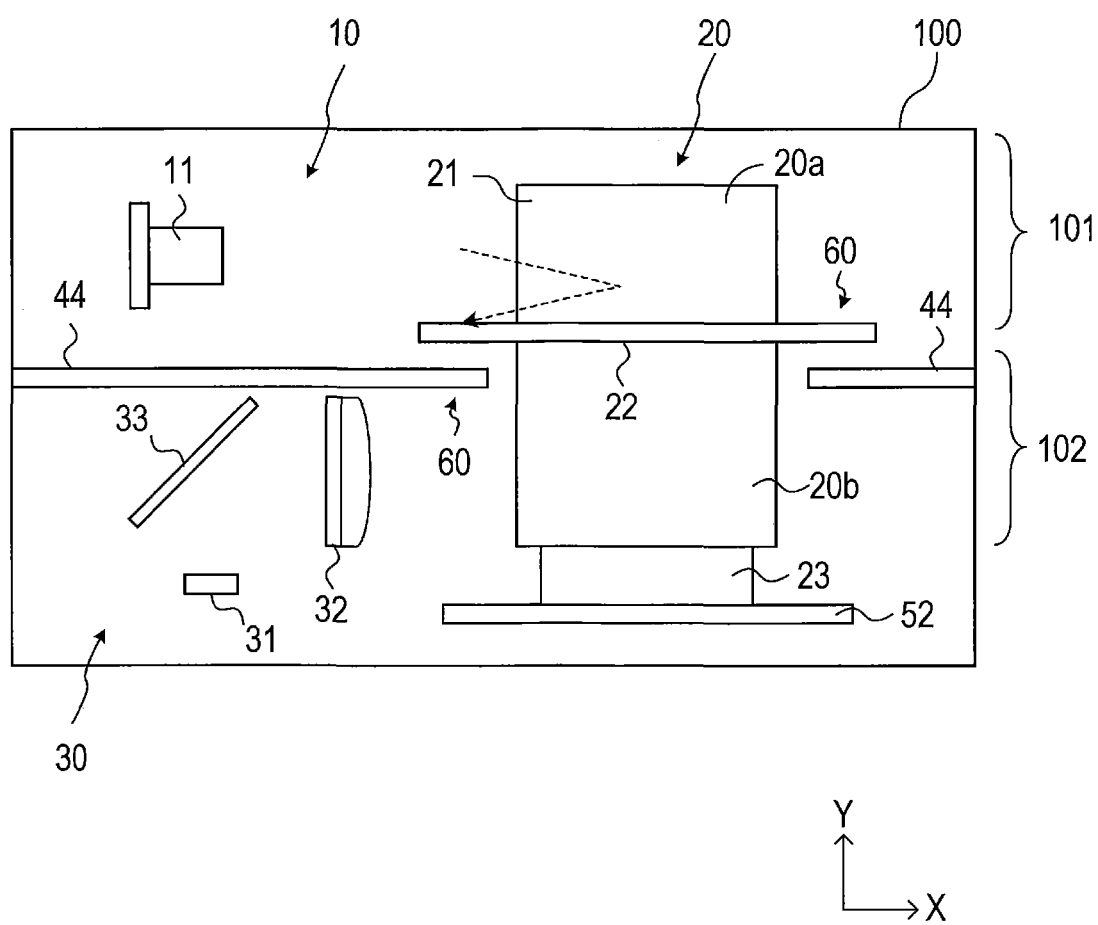
FIG. 8 is an explanatory diagram illustrating a schematic configuration of a lidar apparatus according to a third embodiment seen from the front and a function at an overlap portion.
Figure 9:
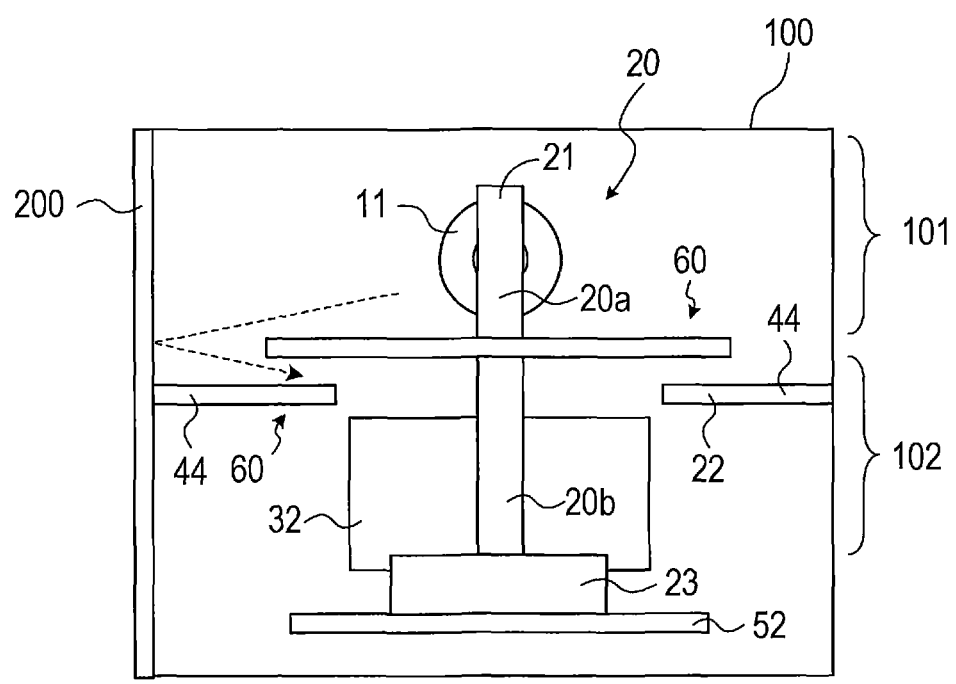
FIG. 9 is an explanatory diagram illustrating a schematic configuration of the lidar apparatus according to the third embodiment seen from the side and the function at the overlap portion.

The third embodiment is different from the first embodiment in that respective locations of the light shielding plate 22 and the partitioning portion 44 in the vertical direction are reversed as illustrated in FIG. 8 and FIG. 9.

That is, the partitioning portion 44 is disposed closer to the light-receiving space 102 than the light shielding plate 22 is.

[3-2. Effects]

The third embodiment achieves the following effect in addition to the above effect (1a) of the first embodiment.

(3a) In the present embodiment, the partitioning portion 44 is provided closer to the light-receiving space 102 than the light shielding plate 22 is, allowing for effectively reducing leakage of the light directed from the light-emitting modules 11 and 12 to the light-projecting deflector 20a and reflected from the light-projecting deflector 20a into the side of the light-receiving space 102. That is, the light directed from the light-emitting module 11 to the scanner 20 and reflected on the scanner 20 is prevented from directly entering the overlap portion 60 as illustrated in FIG. 8. It should be noted that the light directed from the light-emitting module 11 to the optical window 200 and reflected on the optical window 200 may enter the overlap portion 60 as illustrated in FIG. 9. That is, the configuration according to the present embodiment is beneficial to a case where the reflected light from the scanner 20 has a larger influence on the leakage of light from the light-projecting space 101 into the light-receiving space 102 than the reflected light from the optical window 200.

Other Embodiments

In the foregoing, the embodiments of the present disclosure have been described; however, the present disclosure is by no means limited to the above embodiments but may be implemented with a variety of modifications.

Figure 10:
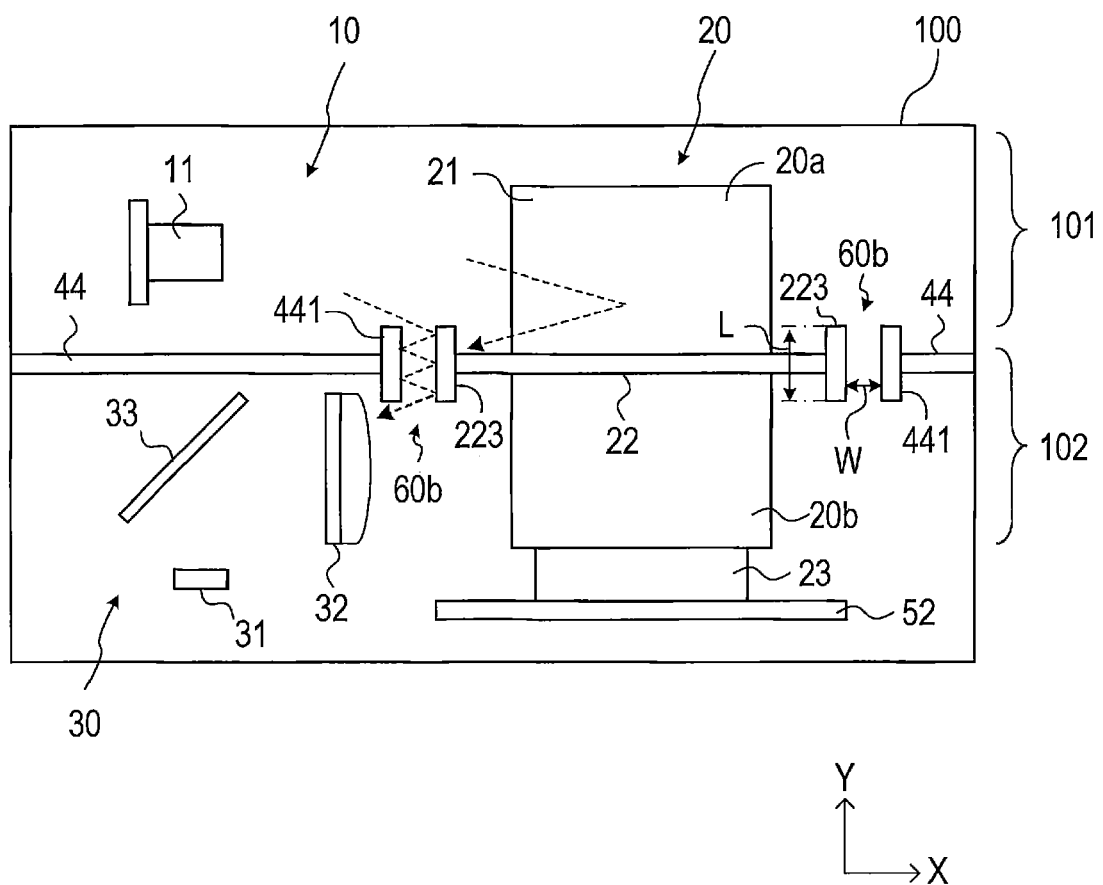
FIG. 10 is an explanatory diagram illustrating a schematic configuration of a lidar apparatus according to another embodiment seen from the front and a function at an overlap portion.

(4a) In the above embodiments, the light shielding plate 22 and the partitioning portion 44 are disposed with respective plate surfaces thereof overlapping. In this regard, the light shielding plate 22 and the partitioning portion 44 may be disposed within the same plane while facing each other at respective distal end portions provided with opposite walls 223 and 441 defining an overlap portion 60b therebetween as illustrated in FIG. 10. In this case, the distance W between the opposite walls 223 and 441 and the width L of the opposite walls 223 and 441 in the vertical direction may be designed by a way of thinking similar to that for the distance W and the width L of the overlap portion 60 in the above embodiments.

(4b) In the above embodiments, of the two spaces vertically separated by the partitioning portion 44, the upper space is defined as the light-projecting space 101 and the lower space is defined as the light-receiving space 102; however, the upper space and the lower space may be reversely defined as the light-receiving space 102 and the light-projecting space 101, respectively.

(4c) A plurality of functions of a single component in any of the above embodiments may be implemented by a plurality of components or a single function of a single component may be implemented by a plurality of components. Further, a plurality of functions of a plurality of components may be implemented by a single component or a single function to be implemented by a plurality of components may be implemented by a single component. Further, a part of the configuration of any of the above embodiments may be omitted. Further, at least a part of the configuration of any of the above embodiments may be added to or replaced with the configuration of another one of the above embodiments.

(4d) In addition to the above lidar apparatus 1, the present disclosure may be implemented in a variety of aspects such as a system including the lidar apparatus 1 as a component.

A lidar apparatus according to an aspect of the present disclosure includes a light projector (10), a light receiver (30), a canner (20), an enclosure (100), a partition plate (44), and a light shielding plate (22, 22a).

A light projector emits light in a predetermined direction. A light receiver receives light arriving from a predetermined direction. A scanner includes a deflecting mirror that reflects light entering from the light projector. The scanner rotates the deflecting mirror with respect to a predetermined rotation axis, thereby changing an output direction, which is a direction for the light entering from the light projector to be reflected by the deflecting mirror and outputted, along a main scanning direction orthogonal to an axial direction of the rotation axis. The scanner causes reflected light from a target present within a scanning range to be reflected by the deflecting mirror and led to the light receiver. An enclosure houses the light projector, the light receiver, and the scanner. A partition plate includes a material that blocks transmission of light and partitions an internal space of the enclosure into a light-projecting space where the light projector is disposed and a light-receiving space where the light receiver is disposed. A light shielding plate includes a material that blocks transmission of light, is provided between a light-projecting deflector, which is a portion of the deflecting mirror used for light projection, and a light-receiving deflector, which is a portion of the deflecting mirror used for light reception, and integrally rotates with the deflecting mirror. Further, the partition plate has, with respect to at least a part of a peripheral portion of the light shielding plate, an overlap portion (60, 60a, 60b) where a plate surface of the partition plate and a plate surface of the light shielding plate overlap without being in contact with each other.

Such a configuration allows light passing through the overlap portion to be repeatedly reflected and thus attenuated during passage thereof. This makes it possible to reduce intensity of light leaking through the overlap portion from the light-projecting space into the light-receiving space. As a result, it is possible to reduce a decrease in detection performance resulting from detecting a non-existent obstacle at very close range or detecting an obstacle in a direction where it does not actually exist.

What is claimed is:

1. A lidar apparatus comprising:
a light projector configured to emit light in a predetermined direction;
a light receiver configured to receive light arriving from a predetermined direction;
a scanner including a deflecting mirror configured to reflect light entering from the light projector, the scanner configured to rotate the deflecting mirror with respect to a predetermined rotation axis, thereby changing an output direction, which is a direction for the light entering from the light projector to be reflected by the deflecting mirror and outputted, along a main scanning direction orthogonal to an axial direction of the rotation axis, the scanner configured to cause reflected light from a target present within a scanning range to be reflected by the deflecting mirror and led to the light receiver;
an enclosure that houses all of the light projector, the light receiver, and the scanner;
a partition plate made of a material that blocks transmission of light, the partition plate configured to partition an internal space of the enclosure into a light-projecting space where the light projector is disposed and a light-receiving space where the light receiver is disposed; and
a light shielding plate made of a material that blocks transmission of light, the light shielding plate provided between a light-projecting deflector, which is a portion of the deflecting mirror used for light projection, and a light-receiving deflector, which is a portion of the deflecting mirror used for light reception, the light shielding plate configured to integrally rotate with the deflecting mirror, wherein:
the light-projecting deflector of the deflecting mirror and the light-receiving deflector of the deflecting mirror form the same plane,
the light-projecting deflector and the light-receiving deflector are composed of one flat plate-shaped mirror,
a width of the light-receiving deflector along a direction orthogonal to the rotation axis is equal to or less than a diameter of the light shielding plate,
a width of the light-projecting deflector is less than the width of the light-receiving deflector,
the partition plate is located closer to the light-projecting space than the light shielding plate is, and
the partition plate has, with respect to at least a part of a peripheral portion of the light shielding plate, an overlap portion where a plate surface of the partition plate and a plate surface of the light shielding plate overlap portion without being in contact with each other,
wherein
a portion of the light-projecting deflector is positioned in the light-receiving space.

2. The lidar apparatus according to claim 1, wherein:
the light shielding plate includes a cylindrical portion that projects toward a side where the partition plate is located, and
the partition plate is configured to face the cylindrical portion at a distal end of the overlap portion.

3. The lidar apparatus according to claim 1, wherein:
a distance between the light shielding plate and the partition plate in the overlap portion and a width of the overlap portion are set in accordance with an incidence angle of light assumed to enter the overlap portion such that the light is reflected at least once in the overlap portion.

4. The lidar apparatus according to claim 1, wherein:
the scanner includes a mirror module which is a flat plate-shaped member with a pair of the deflecting mirrors attached at both sides thereof.

5. The lidar apparatus according to claim 1, wherein:
the partition plate is configured as a part of a frame or a part of the enclosure, the frame being a member for assembling respective components of the light projector, the scanner, and the light receiver into one piece.

6. The lidar apparatus according to claim 1, wherein the light-receiving deflector is disposed on a motor configured to rotate such that the deflecting mirror rotates in response to rotation by the motor.

7. The lidar apparatus according to claim 1, wherein the light shielding plate partitions the flat plate-shaped mirror to partition the deflecting mirror into the light-projecting deflector and the light-receiving deflector.

* * * * *